US011133522B2

(12) United States Patent
Li et al.

(10) Patent No.: US 11,133,522 B2
(45) Date of Patent: Sep. 28, 2021

(54) LITHIUM-SULFUR BATTERY, A DUAL BLOCKING LAYER, METHODS OF MAKING, AND METHODS OF USE THEREOF

(71) Applicant: KING ABDULLAH UNIVERSITY OF SCIENCE AND TECHNOLOGY, Thuwal (SA)

(72) Inventors: Lain-Jong Li, Thuwal (SA); Jun Ming, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 414 days.

(21) Appl. No.: 15/772,165

(22) PCT Filed: Dec. 13, 2016

(86) PCT No.: PCT/IB2016/057574
§ 371 (c)(1),
(2) Date: Apr. 30, 2018

(87) PCT Pub. No.: WO2017/103783
PCT Pub. Date: Jun. 22, 2017

(65) Prior Publication Data
US 2018/0323465 A1     Nov. 8, 2018

Related U.S. Application Data

(60) Provisional application No. 62/266,757, filed on Dec. 14, 2015.

(51) Int. Cl.
*H01M 4/13*     (2010.01)
*H01M 10/052*     (2010.01)
(Continued)

(52) U.S. Cl.
CPC ....... *H01M 10/052* (2013.01); *H01M 4/0402* (2013.01); *H01M 4/0485* (2013.01);
(Continued)

(58) Field of Classification Search
CPC ............ H01M 10/052; H01M 10/058; H01M 4/0402; H01M 4/0485; H01M 4/38;
(Continued)

(56) References Cited

U.S. PATENT DOCUMENTS 9,325,002 B2 * 4/2016 Inagaki ................ H01M 4/485
2013/0309572 A1 * 11/2013 Zhang .................... H01M 4/13
429/217

(Continued)

FOREIGN PATENT DOCUMENTS

JP     2012014892 A     1/2012

OTHER PUBLICATIONS

International Search Report in related International Application No. PCT/IB2016/057574, dated Feb. 9, 2017.
(Continued)

*Primary Examiner* — Raymond Alejandro
(74) *Attorney, Agent, or Firm* — Patent Portfolio Builders PLLC

(57) ABSTRACT

The present disclosure provides for a lithium-sulfur battery with a dual blocking layer between the anode and cathode, providing for high storage capacity and improved performance.

20 Claims, 12 Drawing Sheets

(51) Int. Cl.
| | |
|---|---|
| H01M 4/485 | (2010.01) |
| H01M 4/38 | (2006.01) |
| H01M 4/62 | (2006.01) |
| H01M 50/403 | (2021.01) |
| H01M 4/04 | (2006.01) |
| H01M 4/58 | (2010.01) |
| H01M 4/583 | (2010.01) |
| H01M 10/058 | (2010.01) |
| H01M 4/02 | (2006.01) |

(52) U.S. Cl.
CPC ............. *H01M 4/38* (2013.01); *H01M 4/485* (2013.01); *H01M 4/583* (2013.01); *H01M 4/5815* (2013.01); *H01M 4/625* (2013.01); *H01M 10/058* (2013.01); *H01M 50/403* (2021.01); *H01M 2004/027* (2013.01); *H01M 2004/028* (2013.01)

(58) Field of Classification Search
CPC .... H01M 4/485; H01M 4/5815; H01M 4/583; H01M 4/625; H01M 2/145; H01M 2004/027; H01M 2004/028
See application file for complete search history.

(56) References Cited

U.S. PATENT DOCUMENTS

| | | |
|---|---|---|
| 2013/0337293 A1 | 12/2013 | Eisele et al. |
| 2015/0056507 A1 | 2/2015 | Dadheech et al. |
| 2015/0084604 A1 | 3/2015 | Thillaiyan et al. |
| 2015/0221937 A1 | 8/2015 | Kim et al. |
| 2017/0250398 A2* | 8/2017 | Theuerkauf .......... H01M 4/0411 |

OTHER PUBLICATIONS

Weber, V., et al., "Computational Study of Lithium Titanate as a Possible Cathode Material for Solid-State Lithium-Sulfur Batteries," Journal of Physical Chemistry C, May 7, 2015, vol. 119, No. 18, pp. 9681-9691.

Written Opinion of the International Searching Authority in related International Application No. PCT/IB2016/057574, dated Feb. 9, 2017.

Agostini et al., "A lithium-ion sulfur battery using a polymer, polysulfide-added membrane," Scientific Reports, Jan. 2015, pp. 1-5, vol. 5, Article No. 7591, Macmillan Publishers Limited. DOI: 10.1038/srep07591.

Agostini et al., "An Advanced Lithium-Ion Sulfur Battery for High Energy Storage," Advanced Energy Materials, Jun. 2015, pp. 1-6, vol. 5, Issue 16, WILEY-VCH Verlag GmbH & Co. KGaA, Weinheim. DOI: 10.1002/aenm.201500481.

Agostini et al., "Polysulfide-containing Glyme-based Electrolytes for Lithium Sulfur Battery," Chemistry of Materials, Jun. 2015, pp. 4604-4611, vol. 27, ACS Publications. DOI: 10.1021/acs.chemmater.5b00896.

Bruce et al., "Li—O2 and Li—S batteries with high energy storage," Nature Materials, Jan. 2012, pp. 19-29, vol. 11, Macmillan Publishers Limited. DOI: 10.1038/NMAT3191.

Chen et al. "Monodispersed Sulfur Nanoparticles for Lithium-Sulfur Batteries with Theoretical Performance," Dec. 2014, pp. 798-802, vol. 15, Issue 1, Nano Letters, ACS Publications. DOI: 10.1021/nl504963e.

Demir-Cakan et al., "Li—S batteries: simple approaches for superior performance," Energy & Environmental Science, Jan. 2013, pp. 176-182, vol. 6, The Royal Society of Chemistry, RSC Publishing. DOI: 10.1039/c2ee23411d.

Evers et al., "New Approaches for High Energy Density Lithium-Sulfur Battery Cathodes," Accounts of Chemical Research, May 21, 2013, pp. 1135-1143, vol. 46, No. 5, American Chemical Society. DOI: 10 1021/ar3001348.

Fan et al., "Ternary Hybrid Material for High-Performance Lithium-Sulfur Battery," Journal of the American Chemical Society, Sep. 2015, pp. 12946-12953, vol. 137, Issue 40, ACS Publications DOI: 10 1021/jacs.5b07071.

Fu et al., "Highly Reversible Lithium/Dissolved Polysulfide Batteries with Carbon Nanotube Electrodes," Angewandte Communications, May 2013, pp. 6930-6935, vol. 52, Issue 27, Wiley-VCH Verlag GmbH & Co. KGaA, Weinheim. DOI: 10.1002/anie.201301250.

Fu et al., "Li 2 S-Carbon Sandwiched Electrodes with Superior Performance for Lithium-Sulfur Batteries," Advanced Energy Materials, Aug. 2013, pp. 1-5, vol. 4, Issue 1, WILEY-VCH Verlag GmbH & Co. KGaA, Weinheim. DOI: 10.1002/aenm.201300655.

Guo et al., Sulfur-Impregnated Disordered Carbon Nanotubes Cathode for Lithium-Sulfur Batteries, NANO Letters, Sep. 2011, pp. 4288-4294, vol. 11, ACS Publications DOI: 10 1021/nl202297p.

Hassoun et al., "A High-Performance Polymer Tin Sulfur Lithium Ion Battery," Angewandte Chemie International Edition, Mar. 2010, pp. 2371-2374, vol. 49, Issue 13, Wiley-VCH Verlag GmbH & Co. KGaA, Weinheim. DOI: 10.1002/anie.200907324.

He et al., "High "C" rate Li—S cathodes: sulfur imbibed bimodal porous carbons," Energy & Environmental Science, Apr. 2011, pp. 2878-2883, vol. 4, Issue 8, The Royal Society of Chemistry. DOI: 10.1039/c1ee01219c.

Huang et al., "Entrapment of sulfur in hierarchical porous graphene for lithium-sulfur batteries with high rate performance from -40 to 60° C.," Nano Energy, Mar. 2013, pp. 314-321, vol. 2, Issue 2, Elsevier Ltd. DOI: 10.1016/j.nanoen.2012.10.003.

Huang et al., "Ionic shield for polysulfides towards highly-stable lithium-sulfur batteries," Energy & Environmental Science, Jan. 2014, pp. 347-353, vol. 7, Issue 1, The Royal Society of Chemistry. DOI: 10 1039/c3ee42223b.

Huang et al., "Manipulating surface reactions in lithium-sulphur batteries using hybrid anode structures," Nature Communications, Feb. 2014, pp. 1-8, vol. 5, Article No. 3015, Macmillan Publishers Limited. DOI: 10.1038/ncomms4015.

Huang et al., "Permselective Graphene Oxide Membrane for Highly Stable and Anti-Self-Discharge Lithium-Sulfur Batteries," ACS Nano, Feb. 2015, pp. 3002-3011, vol. 9, No. 3, ACS Publications. DOI: 10.1021/nn507178a.

Hwang et al., "High-Energy, High-Rate, Lithium-Sulfur Batteries: Synergetic Effect of Hollow TiO2-Webbed Carbon Nanotubes and a Dual Functional Carbon-Paper Interlayer," Advanced Energy Materials, Jan. 2016, vol. 6, Issue 1, WILEY-VCH Verlag GmbH & Co. KGaA, Weinheim. DOI: 10.1002/aenm.201501480.

Jayaprakash et al., "Porous Hollow Carbon-Sulfur Composites for High-Power Lithium-Sulfer Batteries," Angewandte Chemie International Edition, May 2011, vol. 50, Issue 26, pp. 5904-5908, Wiley-VCH Verlag GmbH & Co. KGaA, Weinheim. DOI: 10.1002/anie201100637.

Ji et al., "A highly ordered nanostructured carbon-sulphur cathode for lithium-sulphur batteries," Nature Materials, Jun. 2009, pp. 500-506, vol. 8, Macmillan Publishers Limited. DOI: 10.1038//NMAT2460.

Ji et al., "Graphene Oxide as a Sulfur Immobilizer in High Performance Lithium/Sulfur Cells," Journal of the American Chemical Society, Oct. 2011, pp. 18522-18525, vol. 133, ACS Publications. DOI: 10.1021/ja206955k.

Ji et al., "Porous carbon nanofiber-sulfur composite electrodes for lithium/sulfur cells," Energy & Environmental Science, Sep. 2011, pp. 5053-5059, vol. 4, The Royal Society of Chemistry. DOI: 10.1039/c1ee02256c.

Ji et al., "Stabilizing lithium-sulphur cathodes using polysulphide reservoirs," Nature Communications, May 2011, pp. 1-7, Article No. 325, Macmillan Publishers Limited. DOI: 10.1038/ncomms1293.

Jung et al., "A high-rate long-life Li4Ti5O12/Li[Ni0.45Co0.1Mn1.45]O4 lithium-ion battery," Nature Communications, Nov. 2011, pp. 1-5, vol. 2, Article No. 516, Macmillan Publishers Limited. DOI: 10.1038/ncomms1527.

Jung et al., "An improved high-performance lithium-air battery," Nature Chemistry, Jun. 2012, pp. 579-585, vol. 4. DOI: 10.1038/NCHEM.1376.

(56) References Cited

OTHER PUBLICATIONS

Kim et al., "An Advanced Lithium-Sulfur Battery," Advanced Function Materials, May 2012, pp. 1076-1080, vol. 23, Bsue 8, WILEY-VCH Verlag GmbH & Co. KGaA, Weinheim. DOI: 10.1002/adfm.201200689.

Kim et al., "Synthesis of three-dimensionally interconnected sulfur-rich polymers for cathode materials of high-rate ithium-sulfur batteries," Nature Communications, Jun. 2015, vol. 6, Article No. 7278, Macmillan Publishers Limited. DOI: 10.1038/ncomms8278.

Lee et al., "Highly Cyclable Lithium-Sulfur Batteries with a Dual-Type Sulfur Cathode and a Lithiated Si/SiOx Nanosphere Anode," Nano Letters, Apr. 2015, pp. 2863-2868, vol. 15, ACS Publications DOI: 10.1021/nl504460s.

Liang et al., "A highly efficient polysulfide mediator for lithium-sulfur batteries," Nature Communications, Jan. 2015, vol. 6, Article No. 5682, Macmillan Publishers Limited. DOI: 10.1038/ncomms6682.

Liang et al., "Sulfur Cathodes Based on Conductive MXene Nanosheets for High-Performance Lithium-Sulfur Batteries," AngewandteChemical International Edition, Feb. 2015, pp. 3907-3911, vol. 54, WILEY-VCH Verlag GmbH & Co. KGaA, Weinheim. DOI: 10.1002/anie.201410174.

Lin et al., "Lithium Polysulfidophosphates: A Family of Lithium-Conducting Sulfur-Rich Compounds for Lithium-Sulfur Batteries," Angewandte Communications, Jun. 2013, pp. 7460-7463, vol. 52, Issue 29, Wiley-VCH Verlag GmbH & Co. KGaA, Weinheim. DOI: 10.1002/anie.201300680.

Lin et al., "Scotch-tape-like exfoliation of graphite assisted with elemental sulfur and graphene-sulfur composites for high-performance lithium-sulfur batteries," Energy & Environmental Science, Feb. 2013, pp. 1283-1290, Issue 4, The Royal Society of Chemistry. DOI: 10.1039/c3ee24324a.

Liu et al., "A facile soft-template synthesis of mesoporous polymeric and carbonaceous nanospheres," Nature Communications, Dec. 2013, vol. 4, Article No. 2798, Macmillan Publishers Limited. DOI: 10.1038/ncomms3798.

Liu et al., "Flexible lithium-oxygen battery based on a recoverable cathode," Nature Communications, Aug. 2015, pp. 1-8, vol. 6, Article No. 7892, Macmillan Publishers Limited DOI: 10.1038/ncomms8892.

Lu et al., "Aprotic and Aqueous Li—O2 Batteries," Chemical Reviews, Apr. 2014, pp. 5611-5640, vol. 114, Issue 11, ACS Publications. DOI: 10.1021/cr400573b.

Ma et al., "A lithium anode protection guided highly-stable lithium-sulfur battery," ChemComm Communication, Sep. 2014, pp. 14209-14212, vol. 50, Issue 91, The Royal Society of Chemistry. DOI: 10.1039/c4cc05535g.

Manthiram et al., "Rechargeable Lithium-Sulfur Batteries," Chemical Reviews, Jul. 2014, pp. 11751-11787, vol. 114, Issue 23, ACS Publications. DOI: 10.1021/cr500062v.

Mikhaylik et al., "Polysulfide Shuttle Study in the Li/S Battery System," Journal of Electrochemical Society, Oct. 2004, pp. A1969-A1976, vol. 151, Issue 11, The Electrochemical Society Inc. DOI: 10.1149/1.1806394.

Ohzuku et al., "Layered Lithium Insertion Material of LiCo1/3Ni1/3Mn1/3O2 for Lithium-Ion Batteries," Chemistry Letters, Apr. 2001, pp. 642-643, vol. 30, No. 7, Chemical Society of Japan. DOI: 10.1246/cl.2001.642.

Park et al., "A review of conduction phenomena in Li-ion batteries," Journal of Power Sources, Jun. 2010, pp. 7904-7929, vol. 195, Issue 24, Elsevier B.V DOI: 10 1016/j.jpowsour.2010.06.060.

Peng et al., "A Reversible and Higher-Rate Li—O2 Battery," Science, Aug. 2012, pp. 563-567, vol. 337, Issue 6094, American Association for the Advancement of Science, Washington, DC DOI: 10.1126/science.1223985.

Scrosati et al., "Lithium-ion batteries. A look into the future," Energy & Environmental Science, Jun. 2011, pp. 3287-3295; vol. 4, The Royal Society of Chemistry DOI: 10.1039/c1ee01388b.

Seh et al., "Sulphur-TiO2 yolk-shell nanoarchitecture with internal void space for long-cycle lithium-sulphur batteries," Nature Communications, Jan. 2013, pp. 1-6, vol. 4, Article No. 1331, Macmillan Publishers Limited. DOI: 10.1038/ncomms2327.

Shin et al., "High-power lithium polysulfide-carbon battery," Carbon, Jan. 2016, pp. 125-130, vol. 96, Elsevier Ltd. DOI: 10.1016/j.carbon.2015.09.034.

Su et al., "A strategic approach to recharging lithium-sulphur batteries for long cycle life," Nature Communications, Dec. 2013, pp. 1-8, vol. 4, Article No. 2985, Macmillan Publishers Limited. DOI: 10.1038/ncomms3985.

Su et al., "Lithium-sulphur batteries with a microporous carbon paper as a bifunctional interlayer," Nature Communications, Nov. 2012, vol. 3, Article No. 1166, Macmillan Publishers Limited. DOI: 10.1038/ncomms2163.

Urbonaite et al., "Progress Towards Commercially Viable Li—S Battery Cells," Advanced Energy Materials, Apr. 2015; pp. 1-20, vol. 5, Issue 16, WILEY-VCH Verlag GmbH & Co. KGaA, Weinheim. DOI: 10.1002/aenm.201500118.

Wang et al., "A high performance lithium-ion sulfur battery based on a Li2S cathode using a dual-phase electrolyte," Energy & Environmental Science, May 2015, pp. 1551-1558, vol. 8, Issue 5, The Royal Society of Chemistry. DOI 10.1039/c5ee00058k.

Wang et al., "Carbonyl-β-Cyclodextrin as a Novel Binder for Sulfur Composite Cathodes in Rechargeable Lithium Batteries," Advanced Functional Materials, Oct. 2012, pp. 1194-1201, vol. 23, WILEY-VCH Verlag GmbH & Co. KGaA, Weinheim. DOI: 10.1002/adfm.201201847.

Wang et al., "Graphene-Wrapped Sulfur Particles as a Rechargeable Lithium-Sulfur Battery Cathode Material with High Capacity and Cycling Stability," Nano Letters, Jun. 2011, pp. 2644-2647, vol. 11, ACS Publications. DOI: 10.1021/nl200658a.

Wei et al., "Metal-Sulfur Battery Cathodes Based on PAN-Sulfur Composites," Journal of the American Chemical Society, Sep. 2015, pp. 12143-12152, vol. 137, Issue 37, ACS Publications. DOI: 10.1021/jacs.5b08113.

Wu et al., "In Situ Raman Spectroscopy of Sulfur Speciation in Lithium-Sulfur Batteries," ACS Applied Materials & Interfaces, Jan. 2015, pp. 1709-1719, vol. 7, Issue 3, ACS Publications. DOI: 10.1021/am5072942.

Xin et al., "Smaller Sulfur Molecules Promise Better Lithium-Sulfur Batteries," Journal of the American Chemical Society, Oct. 2012, p. 18510-18513, vol. 134, p. 18510-18513, ACS Publications. DOI: dx.doi.org/10.1021/a308170k.

Zaghib et al., "Electrochemical study of Li4Ti5O12 as negative electrode for Li-ion polymer rechargeable batteries," Journal of Power Sources, Sep. 1999, pp. 300-305, vols. 81-82, Elsevier Science S.A. DOI: 10.1016/50378-7753(99)00209-8.

Zhang et al., "Enhancement of long stability of sulfur cathode by encapsulating sulfur into micropores of carbon spheres," Energy & Environmental Science, Aug. 2010, pp. 1531-1537, Issue 10, The Royal Society of Chemistry. DOI: 10.1039/c002639e.

Zhang, S., "Role of LiNO3 in rechargeable lithium/sulfur battery," Electrochimica Acta, May 2012, pp. 344-348, vol. 70, Elsevier Ltd. DOI: 10.1016/j.electacta.2012.03.081.

Zhao et al., "Unstacked double-layer templated graphene for high-rate lithium-sulphur batteries," Nature Communications, Mar. 2014, vol. 5, Article No. 3410, Macmillan Publishers Limited. DOI: 10.1038/ncomms4410.

Zhou et al., "A flexible nanostructured sulphur-carbon nanotube cathode with high rate performance for Li—S batteries," Energy & Environment Science, Jul. 2012, pp. 8901-8906, vol. 5, The Royal Society of Chemistry. DOI: 10.1039/c2ee22294a.

Zhou et al., "Long-life Li/polysulphide batteries with high sulphur loading enabled by lightweight three-dimensional nitrogen/sulphur-codoped graphene sponge," Nature Communications, Jul. 2015, vol. 6, Article No. 7760, Macmillan Publishers Limited. DOI: 10.1038/ncomms8760.

Zhou et al., "Polydopamine-Coated, Nitrogen-Doped, Hollow Carbon-Sulfur Double-Layered Core-Shell Structure for mproving Lithium-Sulfur Batteries," Nano Letters, Aug. 2014, pp. 5250-5256, vol. 14, Issue 9, ACS Publications. DOI: 10.1021/nl502238b.

(56) References Cited

OTHER PUBLICATIONS

Zhou et al., "Yolk-Shell Structure of Polyaniline-Coated Sulfur for Lithium-Sulfur Batteries," Journal of the American Chemical Society, Oct. 2013, pp. 16736-16743, vol. 135, ACS Publications. DOI: 10.1021/ja409508q.

Chung et al., "Bifunctional Separator with a Light-Weight Carbon-Coating for Dynamically and Statically Stable Lithium-Sulfur Batteries," Advanced Functional Materials, Sep. 2014, pp. 5299-5306, vol. 24, Issue 33, WILEY-VCH Verlag GmbH & Co. KGaA, Weinheim. DOI: 10.1002/adfm.201400845.

* cited by examiner

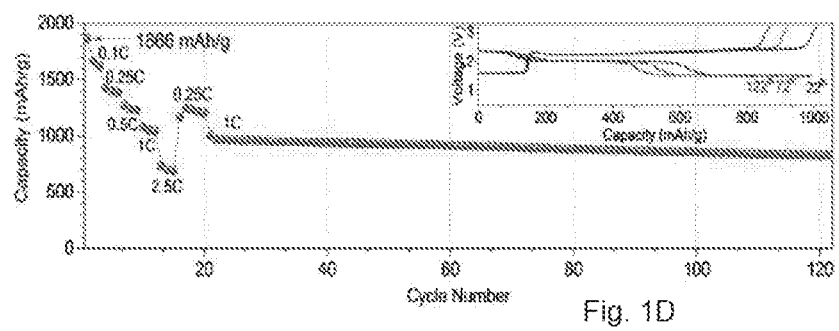
Fig. 1D
Fig. 2A
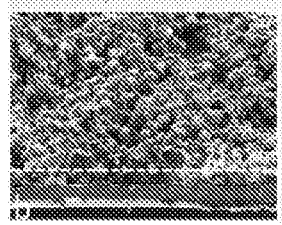 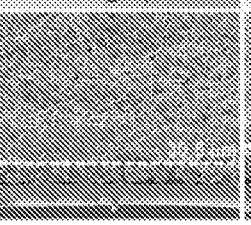 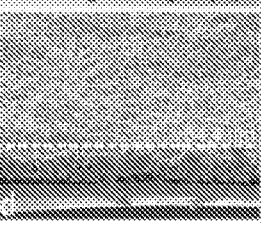
Fig. 2B　　　　　Fig. 2C　　　　　Fig. 2D

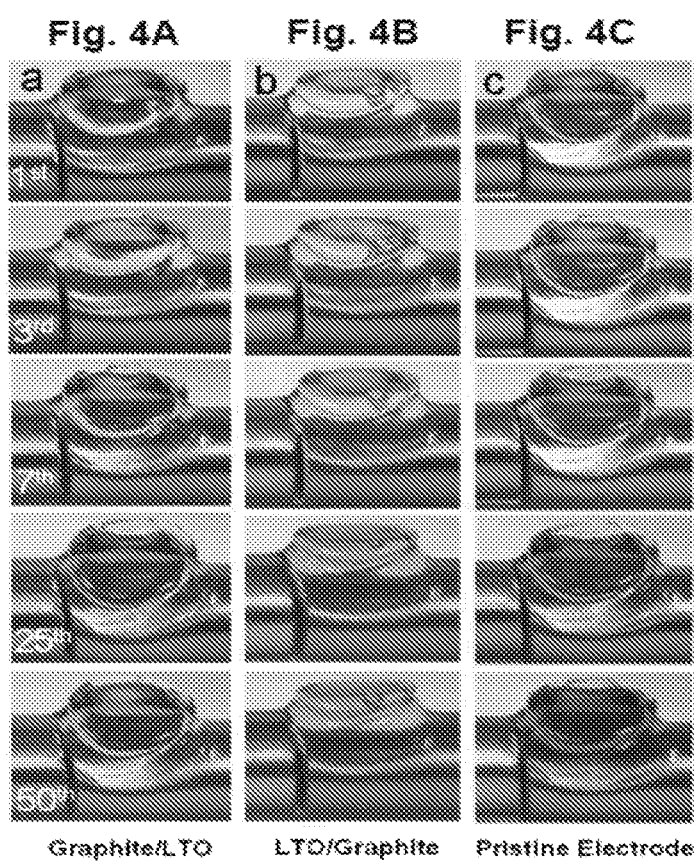

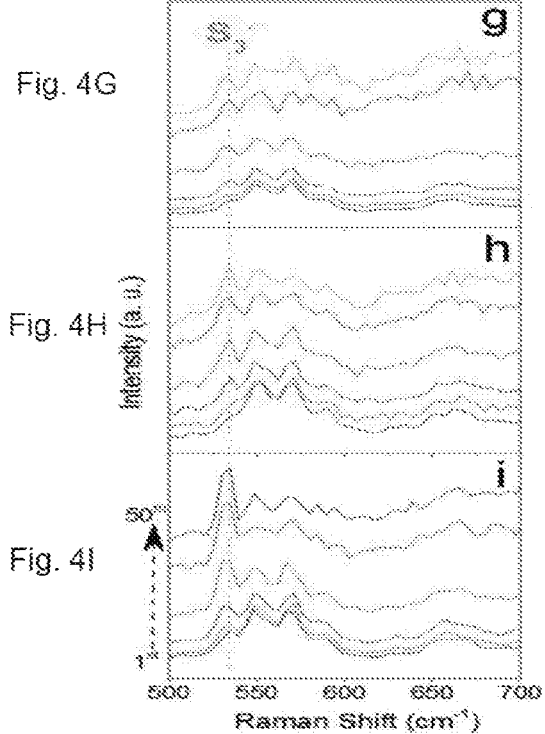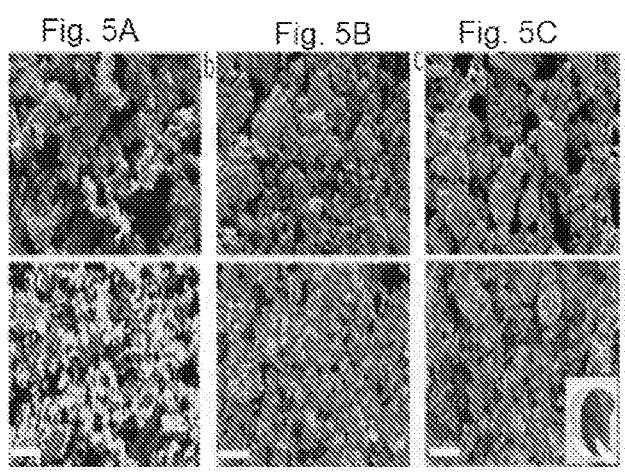

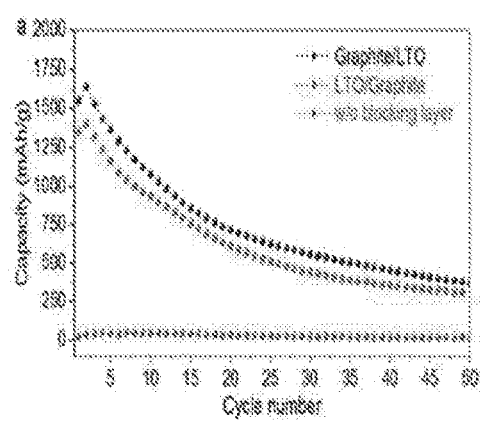
Fig. 7A
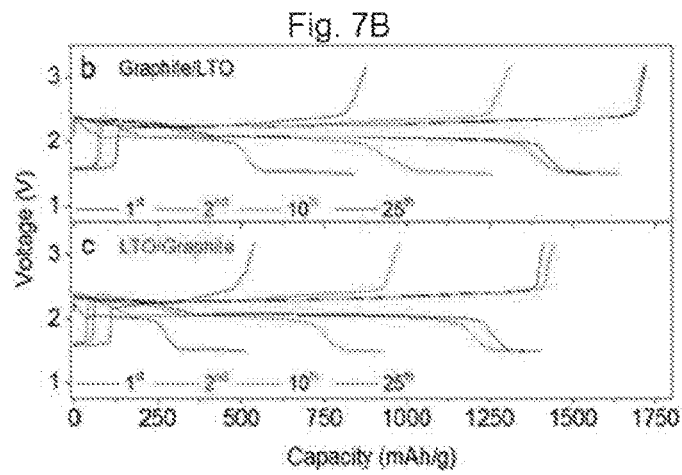
Fig. 7B
Fig. 7C

LITHIUM-SULFUR BATTERY, A DUAL BLOCKING LAYER, METHODS OF MAKING, AND METHODS OF USE THEREOF

CROSS-REFERENCE TO RELATED APPLICATIONS

This application is a U.S. National Stage Application of International Application No. PCT/IB2016/057574, filed on Dec. 13, 2016, which claims the benefit of and priority to U.S. Provisional Application Ser. No. 62/266,757, having the title "LITHIUM-SULFUR BATTERY, A DUAL BLOCKING LAYER, METHODS OF MAKING, AND METHODS OF USE THEREOF," filed on Dec. 14, 2015, the disclosures of which are incorporated herein by reference in their entirety.

BACKGROUND

Sulphur (S) has been recognized as a promising electrode material for next generation Li—S batteries owing to its high theoretical specific capacity. However, the problem of low sulphur utilization and severe capacity fading still remain to be addressed before their commercialization.

SUMMARY

The present disclosure provides for a lithium-sulfur battery with a dual blocking layer between the anode and cathode, providing for high storage capacity and improved performance.

An embodiments of the present disclosure provides for a battery, among others, that includes: an anode and a cathode, wherein a dual blocking layer is disposed on the cathode. The dual blocking layer is a graphite/$Li_4Ti_5O_{12}$, and the dual layer is between the anode and the cathode.

An embodiment of the present disclosure includes a battery, among others, that includes: an anode and a cathode, wherein a dual blocking layer is disposed on the cathode. The dual blocking layer is a conductive material and lithium storage medium, and the dual layer is between the anode and the cathode.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIGS. 1A-D show the scheme of hybrid lithium-sulphur battery and electrochemical performances. FIG. 1A is a schematic for the hybrid lithium-sulphur battery, in which the sulphur-rich cathode of 90 wt % sulphur-10 wt % Super P® (conductive carbon black, TIMCAL) composite was covered by the layer of graphite and LTO. Voltage vs. capacity profiles of the sulphur rich electrode covered by the layer of graphite and LTO. FIG. 1B shows graphite/LTO and FIG. 1C shows LTO/graphite under different rate. FIG. 1D shows rate capability and cycle performance of hybrid battery using the graphite/LTO blocking layer. The inset of FIG. 1D is the typical voltage vs. capacity profiles at the rate of 1 C.

FIGS. 2A-G demonstrate surface morphology of sulphur rich cathode covered by the layer of graphite and LTO. FIGS. 2A, 2B, and 2E and is a digital photograph, scanning electron microscope (SEM) and energy-dispersive X-ray mapping of the pristine sulphur rich cathode, and that can be covered respectively by (FIG. 2C, 2F) graphite and (FIG. 2D, 2G) graphite/LTO layer. Scale bar: 100 μm. The color of blue, yellow, red (FIG. 2F), green and pink-white (FIG. 2G) (and corresponding shades of grey) present elements of aluminium, sulphur, carbon, fluorine and steric situation of LTO respectively.

FIG. 3A plots open-circuit voltage vs. time curve, FIG. 3B illustrates cyclic voltammetry, FIG. 3O illustrates the plot of normalized peak current ($i_p$) with the square root of the scan rate ($v^{1/2}$) and FIG. 3D illustrates the Niquist plot of battery using a graphite/LTO, a LTO/graphite layer and pristine electrode without a blocking layer.

FIGS. 4A-I illustrate visual observation and operando Raman analysis. FIG. 4A shows photos for the cycled batteries with a graphite/LTO layer. FIG. 4B shows a LTO/graphite layer and FIG. 4C shows pristine electrode after the $1^{st}$, $3^{rd}$, $7^{th}$, $25^{th}$ and $50^{th}$ charge/discharge cycles. FIG. 4D is a photo of the home-made glass tube battery. FIG. 4E shows a typical operando Raman spectra of the electrolyte after cycling in the battery using graphite/LTO as blocking layer. FIG. 4F shows relative intensity of background at 2500 $cm^{-1}$ calculated based on the equation of $\Delta I_{2500\ cm-1}/I_{vC-H\ (2883\ cm-1)}$, in which in which $\Delta I_{2500\ cm-1}$ is the difference of Raman intensities of baseline at 2500 $cm^{-1}$ comparing to the $1^{st}$ cycle while $I_{vC-H(2883\ cm-1)}$ is the C—H vibration at 2883 $cm^{-1}$. Raman spectrum (500-700 $cm^{-1}$) of the electrolyte in the batteries using blocking layers of (FIG. 4G) graphite/LTO, (FIG. 4H) LTO/graphite and (FIG. 4I) pristine electrode at the $1^{st}$, $3^{rd}$, $7^{th}$, $25^{th}$, $35^{th}$, $50^{th}$ cycles.

FIGS. 5A-H show morphology of the cycled electrode and proposed reaction process. Scanning electron microscope (SEM) and energy-dispersive X-ray mapping of (FIG. 5A) a pristine electrode cycled for (FIG. 5B) $25^{th}$, (FIG. 5C) $50^{th}$ cycles (inset is the photo of cycled electrode) and (FIG. 5D) the schematic illustration for electrode change after cycling. The charge flow in the figure represent the discharge process. (FIG. 5E) Sulphur-rich cathode covered by the graphite/LTO layer cycled for (FIG. 5F) $25^{th}$, (FIG. 5G) $50^{th}$ cycles (inset is the photo of electrode) and (FIG. 5H) the proposed reaction process. Black and red arrow represent the diffusion of lithium ions and transport of electronics. Scale bar length is 50 μm.

FIG. 6A shows cycling performances of battery without and with different blocking layer. Typical voltage vs. capacity profiles of batteries (FIG. 6B) without blocking layer and with (FIG. 6C) graphite, (FIG. 6D) LTO and (FIG. 6E) graphite/LTO layers at the high rate of 1 C. The voltage polarization of batteries using blocking layer and without any blocking layer were compared at the capacity of 500 mAh $g^{-1}$ and 0.3 mAh $g^{-1}$ respectively.

FIGS. 7A-C demonstrate electrochemical performances of battery at high temperature of 60° C. (FIG. 7A) Comparative cycle ability and typical voltage vs. capacity profiles of batteries with using blocking layers of (FIG. 7B)

graphite/LTO and (FIG. 7C) LTO/graphite under the rate of 10 at the high temperatures of 60° C.

Figure 8:
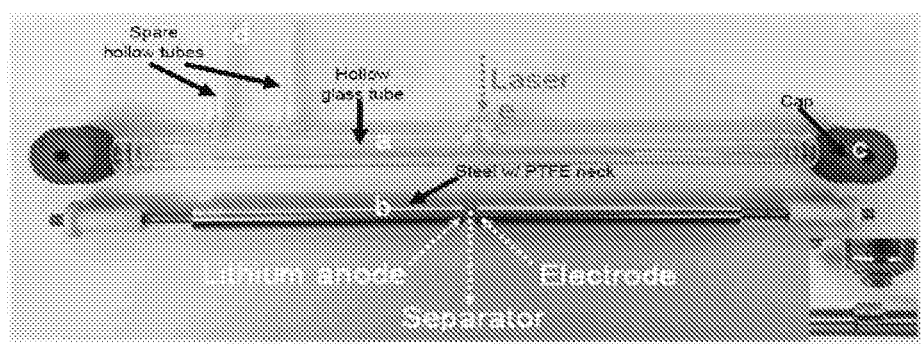

FIG. 8 is an embodiment of a battery, with parts labeled (a) Hollow glass tube, (b) long steel with polytetrafluoroethylene (PTFE) neck, between which the anode of lithium, cathode of sulfur and separator were placed to assemble the battery, (c) red cap which were used to seal the PTFE neck, (d) spare hollow tubes which are available to fill and exhaust gas if necessary, such as in the study of the lithium-oxygen battery. In this hybrid lithium battery, the small hollow tubes of (d) were sealed. The position of (e) on the hollow glass tube is a projection with the flat surface for holding and investigating the electrolyte by laser during the collection of Raman spectrum. Right inset is a photo of cycled battery in the test.

Figure 9A:
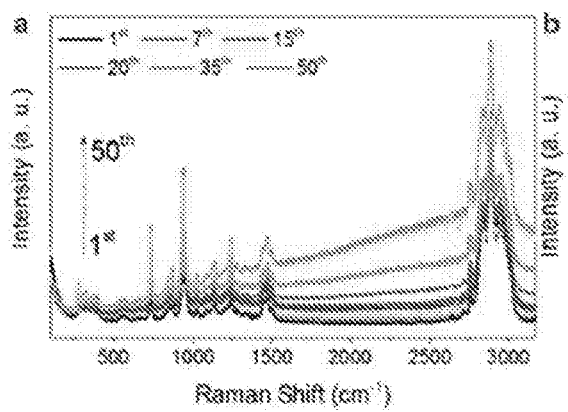
Figure 9B:
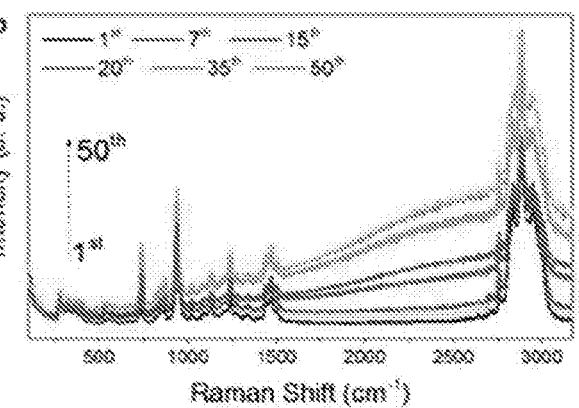

FIGS. 9A-B provide Operando Raman spectrum of electrolyte as cycling. Batteries with using (FIG. 9A) graphite/LTO and without blocking layer (FIG. 9B) tested under the scan rate of 0.1 mV s$^{-1}$.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein.

Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for batteries including dual blocking layers, lithium-sulfur batteries, methods of making dual blocking layers, methods of making lithium-sulfur batteries, and the like. Embodiments of the present disclosure can be advantageous since the use of the dual blocking layer can efficiently stabilize the cathode (e.g., sulfur cathode) with higher utilization (e.g., sulfur utilization) and enhance the capacity of battery contributed by the unique blocking layer (e.g., graphite/LTO). Because of the additional capacity and work voltage plateau contributed from the blocking layer, embodiments of the present disclosure provide for a battery (e.g., an advanced lithium-sulfur battery) with higher capacity, improved stability and more voltage plateaus are introduced.

Furthermore, the dual blocking layer can work with a variety of electrode materials with diverse voltage plateaus. In an exemplary embodiment, the dual blocking layer can be used to stabilize lithium-sulfur batteries and particularly enrich lithium batteries, which is significant for providing more choice in energy devices. Embodiments of the present disclosure provide lithium-sulfur batteries with superior stability, enhanced capacity and more voltage plateau, which can be used for portable electronic devices, grid storage and electric vehicles (EV).

Lithium-sulfur batteries are considered as the next generation high performance battery. However, the low sulfur utilization and sever capacity fading are parameters that need to be addressed. Embodiments of the present disclosure provide for dual blocking layers that can enhance overall performance of the batteries, in particular lithium batteries, hybrid lithium batteries (e.g., lithium-sulfur batteries).

An embodiment of the present disclosure includes a dual blocking layer having a conductive material and a lithium storage medium, where conductive material and the lithium storage medium are immediately adjacent one another. The dual layer is between the anode and the cathode. In an embodiment, the lithium storage medium can be a medium having a storage capacity of about 1.0-2.0V.

In an embodiment the conductive material can be a carbon based material, a conductive polymer, or a combination thereof. In an embodiment, the carbon based material can be: graphite, Super P® (conductive carbon black, TIMCAL), active carbon, activated carbon, acetylene black, carbon nanotubes, graphene, graphene oxide, or a combination thereof. In an embodiment, the conductive polymer can be: polyaniline, polypyrrole, polythiophenes, PEDOT:PSS, chitosan, or a combination thereof.

In an embodiment, the lithium storage medium can be: $Li_4Ti_5O_{12}$, $TiO_2$, $MoO_2$, $Fe_2O_3$, $Co_3O_4$, $MoS_2$, or a combination thereof. In a particular embodiment, the dual blocking layer can be graphite/$Li_4Ti_5O_{12}$ (abbreviated as LTO) or spinel $Li_4Ti_5O_{12}$. In an embodiment, the dual blocking layer is included in a battery such as a lithium battery or a hybrid lithium battery (e.g., lithium-sulfur battery). The dual blocking layer can be disposed on the cathode so that it is between the cathode and the anode. In a particular embodiment, the dual blocking layer can be disposed on the cathode so that the conductive material (e.g., graphite) is adjacent the cathode (e.g., sulfur cathode). In an embodiment, the dual blocking layer can have a thin thickness (e.g., several μm, about 1 to 5 or about 1 to 3 μm) or a thick thickness (e.g., over/less 100 μm, or about 75 to 125 μm) depending upon the specific requirement of the device. The other dimensions (e.g., length, width) can vary depending upon the dimensions of the battery.

As mentioned above, an embodiment of the present disclosure includes a lithium-sulfur battery that includes the dual blocking layer (e.g., graphite/LTO). In an embodiment the sulfur cathode and the lithium cathode can include those known in the art. In an embodiment, the battery can include an anode (e.g., lithium metal), an electrolyte (e.g., an organic solvent containing lithium salt), and a cathode of the present disclosure, where the electrolyte is disposed between the anode and cathode and the dual blocking layer is adjacent the cathode so that it is between the lithium electrolyte and the anode. In a particular embodiment, the battery includes a structure such as anode-separator-dual blocking layer/cathode in electrolyte such as shown in the Example. In an embodiment the electrolyte can be a solid electrolyte or a liquid electrolyte. If a solid electrolyte is used, the position of solid electrolyte will replace of the position of separator, in which the solid electrolyte can also behaviors as separator for cathode and anode.

In an embodiment, the lithium-sulfur battery has a capacity about 1800 to 2000 mAh $g^{-1}$ or more. In an embodiment, the lithium-sulfur battery provides multi-voltage platforms from 2.35 V, 2.1 V to 1.55 V. In an embodiment, the lithium-sulfur battery can have an energy density of about 3800 to 4000 Wh $kg^{-1}$ or more, which is about ten times higher or more than a lithium ion battery and also superior than the theoretical 2600 Wh $kg^{-1}$ of lithium-sulphur battery. In an embodiment, the dual blocking layer can obtain about 90 to 100% utilization or about 100% utilization of the sulfur cathode. In addition, the lithium-sulfur battery including the dual blocking layer can have a capacity of about 1200 to 1250 mAh $g^{-1}$ at the high rate of about 1° C. with endurable cycle life over about 100 cycles. Additional details are provided in Example 1.

In an embodiment, the dual blocking layer can be prepared by a two-step coating process. First, a slurry of sulfur and conducting carbon with high sulfur content (i.e., about 80 wt %-100 wt % sulfur) was cast on the current collector of aluminum foil. After drying the electrode, a slurry composed of graphite/polyvinylidene difluoride (PVDF) (9/1, w/w) and LTO/Super P/PVDF (8/1/1, w/w/w) in N-Methyl-2-pyrrolidone (NMP) were cast on top of sulfur electrode step-by-step respectively. The sulfur electrode with dual blocking layer is formed after a complete dry.

EXAMPLE 1

Herein, we present a dual blocking layer of graphite/$Li_4Ti_5O_{12}$ (LTO) to stabilize the sulphur-rich cathode (90 wt % sulphur) with 100% utilization of sulphur is obtained. The graphite/LTO layer not only suppresses the dissolution/migration of polysulfide efficiently but also contributes additional capacity. As a result, an advanced hybrid lithium sulfur battery with an exceptional capacity of 1866 mAh $g_s^{-1}$ at 0.1 C and successive voltage platforms from 2.35 V, 2.1 V to 1.55 V is introduced, giving rise to impressive energy density of 3863 Wh $kg^1$. The extremely high rate capacity of 1226 mAh $g_s^{-1}$ with stable cycle ability over 100 cycles at 1 C are also obtained even at high temperature. The color change of electrolyte as cycling is further characterized by the operando Raman analysis, and a reaction mechanism of the sulphur-rich cathode is presented. This new hybrid lithium battery with dual layer concept can extend to marry different voltage plateau of electrode in one cell and can open a way for providing higher capacity and more voltage platforms available in energy storage and conversion devices.

The development of high capacity rechargeable battery has been pursued intensively in the past two decades, particularly with the strong demand from portable electronic devices and electric vehicles.[1,2] Although recent lithium-air battery may potentially provide an infinite capacity (without considering the weight of oxygen for the reaction of $O_2+2Li^++2e^-\rightarrow Li_2O_2$), the typical capacity usage is strictly controlled (e.g., <2000 mAh $g_{cathode}^{-1}$) to avoid the accumulation of lithium peroxides on cathodes (e.g., carbon,[3] metal oxide[4,5]) since the excess lithium peroxides may lead to the expiry of battery. More efforts are required before it can serve for practical applications.[6] Alternatively, lithium-sulphur battery with the high theoretical capacity of 1675 mAh $g^{-1}$ (i.e., $\frac{1}{8}S_8+2Li^++2e^-\rightarrow Li_2S$) has been considered promising to replace the commonly used metal oxide lithium-ion batteries.[7-12] However, during the discharge process the solid sulphur ($S_8$) always forms soluble lithium polysulfide ($Li_2S_x$, x=4-8) intermediates which will diffuse into the electrolyte and may deposit on anodes to proceed further reactions (i.e., $Li_2S_4\rightarrow 2Li_2S_2\rightarrow 4Li_2S$).[13-15] The formation of insoluble/insulating $Li_2S$ on anodes, particularly those directly react with lithium anode in self-discharge,[13] is the main cause of sulphur loss and internal resistance increase, thereby leading to the low sulphur utilization and severe capacity fading.

To reduce the loss of active sulphur materials in cathode, encapsulation of sulphur in porous and/or hollow structures of different forms such as carbon (e.g., mesoporous carbon,[16,17] hollow carbon,[18,19] carbon nanotubes,[20,21] graphene (oxide)[22]), metal oxide[23] and polymers[24,25] has been reported. These approaches have shown success in suppressing the dissolution and diffusion of polysulphides in electrolytes and the deposition of $Li_2S$ on anodes. Other versatile strategies have also been developed to attack the sulphur dissolution issues, including (1) choosing a stronger binder,[26] (2) seeking polymeric[27,28] and solid separator[29], (3) adding additives[30,31] and/or compensation of polysulphide,[32,33] (4) using porous current collector[34] and/or inserting an interlayer in the cell configuration[35,36] and (5) depositing a protective layer (e.g., carbon,[37] or polymer[38]) on the separator or on the anode.[39] These approaches have substantially retained the polysulphides in cathodes and thus improved the cycle life of Li—S cells. While the materials applied in these strategies play the role of either blocking the diffusion of polysulphides or reducing the internal resistance of batteries, but they do not contribute to the capacity at all. Therefore, it is substantially attractive to explore the possibility to use a lithium storage medium as the sulphur blocking layer as well as a battery capacity booster.

Herein we note that a spinel lithium titanate $Li_4Ti_5O_{12}$ (abbreviated as LTO) layer not only efficiently retards the sulphur dissolution but also allows fast lithium ion diffusion. Further, LTO is a "zero-strain" lithium ion host;[40] thus, it can provide additional capacity with a continued discharge voltage at 1.55 V to the lithium-sulphur battery. In this report, we explore a unique dual blocking layer, LTO on graphite, which enables nearly 100% sulphur utilization for a sulphur rich cathode (i.e., 90 wt % sulphur with 10 wt % Super P simply prepared by physical mixing). This new type of blocking layer gives rise to an endurable hybrid Li—S battery with multi-voltage platforms (i.e., 2.35 V, 2.1 V and 1.55 V) and an extremely high capacity of 1866 mAh g$^{-1}$ (nearly the sum of the full capacities of S and LTO). Such an approach significantly boosts up the overall capacity, improves the cycle stability and demonstrates the possibility of using hybrid structure/material to largely enhance the performance of battery. Further, the change of electrolytes and electrodes with cycling were characterized by the operando Raman analysis and ex-situ scanning electron microscope (SEM), where the S-dissolution from the sulphur rich cathode was carefully studied.

EXPERIMENTAL

Preparation of Electrode

Commercial sulphur (Sigma Aldrich, purity higher than 99.5%) and Super P with the mass ratio of 9:1 were mixed and melted at 250° C. in sealed glass bottle, giving rise to a grey bulk solid which was then crushed by motor and re-melted again. This procedure was repeated for three times before the collection of 90 wt % S-10 wt % Super P composite. As-prepared composite and polyvinylidene difluoride (PVDF) were mixed in the N-Methyl-2-pyrrolidone (NMP) to form a slurry and then casted on the Aluminium foil. Drying the electrode at 40° C. in vacuum oven, then graphite and LTO were coated on the sulphur electrode in a layer-by-layer manner. The graphite was purchased from the company of Fisher Scientific and the $Li_4Ti_5O_{12}$ was synthesized accordingly.[41] The graphite and $Li_4Ti_5O_{12}$ layers were the mixture of graphite/PVDF (w/w, 9/1) and LTO/Super P/PVDF (w/w/w, 8/1/1) respectively, which were suspended in the NMP first and then casted by the same procedures as that of sulphur electrode. Average area mass density of sulphur, graphite and LTO are controlled at around 1.5, 0.75 and 2.64 mg cm$^{-2}$. The electrodes were punched into Ø13 mm circular discs after a complete dry and then assemble the battery. The tuneable mass density of LTO here is about 2.64 mg cm$^{-2}$ (i.e., only 3.50 mg for Ø13 mm electrode), which is much lighter than most intercalated carbon blocking layer.[35]

Electrochemical Test

The performance of the batteries was characterized by the 2032-type coin cell, and they were assembled in the Ar filled glovebox in which the content of oxygen and moisture was strictly controlled below 0.5 ppm. The lithium sulphur battery has the configuration of electrode|separator|lithium-metal model using the electrolyte of 1.0 M bis(trifluoromethane)sulfonamide lithium salt (LiTFSI) in the mixture of 1,3-dioxolane (DIOX)/1,2-dimethoxyethane (DME) (V/V 1:1) (1 wt. % LiNO$_3$ vs. LiTFSI). The amount of electrolyte for each cell is controlled at 150 µL. Galvanostatic cycling was conducted in the voltage window of 1.5-3.2 V using the Arbin battery testing system USA. The specific capacity of electrode was calculated based on the mass of sulphur. Cyclic voltammetry (CV) was carried out under the scan rate of 0.075-0.25 mV s$^{-1}$ and electrochemical impedance spectroscopy (EIS) was acquired over a frequency range of 200 kHz-10 mHz using the instrument of Multi-Channel Potentiostat BioLogic VMP3.

Characterizations

The surface morphology of electrode was characterized by the field emission scanning electron microscope (FE-SEM, FEI Quanta 200), operated at 5 kV and 2.5 mA. The elemental distribution of sulphur, carbon, binder of PVDF and $Li_4Ti_5O_{12}$ were analysed by the energy-dispersive X-ray (EDX) mapping, operated at 10 kV and 6 mA. The operando Raman spectrum of electrolyte was carried out by a specific glass tube battery as we designed and the spectrum was collected on Witec alpha 300R Raman spectrometer at a 514 nm excitation wavelength. The cyclic voltammetry of glass tube battery was performed within the voltage of 1.5-3.2 V under the scan rate of 0.1 mV s$^{-1}$.

Results and Discussion

Hybrid Lithium-Sulphur Battery

Figure 1A:
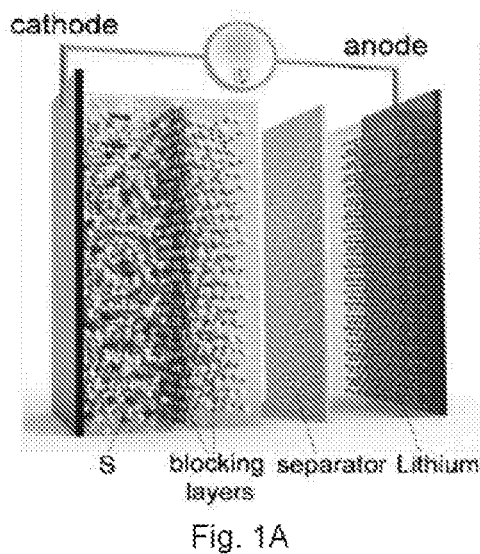
Figure 1B:
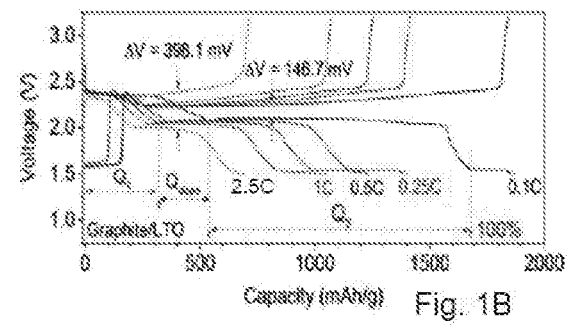

FIGS. 1A-D present the hybrid lithium-sulphur battery composed of a Li metal as the anode and sulphur as the cathode, where a composite blocking layer (a graphite layer followed by the deposition of a LTO layer, abbreviated as graphite/LTO) is applied to retard the S-dissolution. At the rate of 0.1 C, the sulphur utilization can achieve nearly 100% with the capacity of 1675 mAh g$_s^{-1}$ (based on the weight of sulphur). The perfect discharge-charge curve has very flat and smooth voltage platforms at around 2.35V and 2.1V and an extremely low polarization of 146.7 mV which is much lower than most published results.[8-10] In addition to the full capacity from sulphur, the LTO layer also contributes the additional capacity around 191 mAh g$^{-1}$ at 1.55 V, which largely enhances the battery capacity to 1866 mAh g$^{-1}$ and achieves an extremely high energy density of 3863 Wh kg$^{-1}$ (FIG. 1B). In theory, the reactions from solid sulphur to soluble $Li_2S_4$ can give rise to a total capacity of 419 mAh g$^{-1}$, and then a sum capacity of 1256 mAh g$^{-1}$ was delivered in the further reactions (i.e., $Li_2S_4 \rightarrow Li_2S_3/Li_2S_2 \rightarrow Li_2S$) (Table 1). But, there are very few reports succeeding in getting a theoretical capacity because of the serious self-discharge (e.g., chemical reactions between dissolved polysulphides ($Li_2S_x$, x=2-8) and lithium metal).[42-44] To analysis the result, we divide the discharge curves into three regions including the 1$^{st}$ plateau around 2.35 V (i.e., $Q_1$), a slope area from 2.35 V to 2.1 V (i.e., $Q_{slope}$), and the rest of the discharge area from 2.1 V to 1.56 V (i.e., $Q_2$),[45] and the capacities are 321, 218 and 1136 mAh g$^{-1}$ respectively (FIG. 1B), Clearly, the value of $Q_{slope}$, for our current study is among the highest compared with existing reports (Table 2), demonstrating that the dissolved $Li_2S_x$ (x=3-8) are well trapped in the covered layer and then it can give rise to more capacity at a relatively high voltage. Another important parameter of $(Q_1+Q_{slop})/Q_2$, is also presented.[35,45] Generally, the higher value it is, the better ability of cathode to hold the sulphur species should be. In this report, the value of 0.474 is relatively higher than most reported S-cathode, confirming the superior protection ability of graphite/LTO dual layer. With the increasing charge/discharge rate, the high capacities of 1411, 1256, 1076 and 716 mAh g$^{-1}$ at the rate of 0.25, 0.5, 1, 2.5 C are obtained, and particularly the battery has no obvious voltage-decay even to the high rate of 2.5 C[46,47] Meanwhile, the capacity around 1.55V increases to around 280 mAh g$^{-1}$ with the progress of cycling, which may result from a full activation of LTO and the reduction of accumulated Li$_2$S$_2$ to Li$_2$S trapped in the dual blocking layer.

Figure 1C:
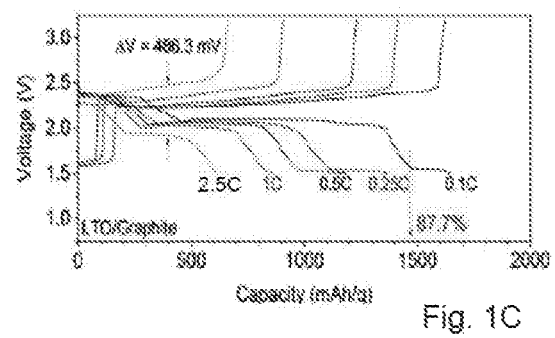

Note that the sequence of the dual blocking layer critically determines the performance of lithium-sulphur batteries. If the LTO is first deposited on the sulphur cathodes and followed by the graphite (abbreviated as LTO/graphite), the sulphur utilization of battery is reduced to 87.7% at 0.1 C with a larger polarization of 486.3 mV (vs. 398.1 mV of graphite/LTO) at 2.5 C (FIG. 1C). Also, the battery shows lower capacities of 1385, 1194, 869 and 632 mAh g$^{-1}$ at 0.1, 0.25, 0.5, 1 and 2.50 C respectively, Particularly, the LTO/graphite layer almost has no capacity contribution at the high rate such as at 1 C, under which the graphite/LTO layer still exhibits a high capacity contribution of 226 mAh g$^{-1}$. The higher sulphur utilization of battery with graphite/LTO layer may benefit from the faster transport of charges endowed by the embedded graphite layer, and the higher LTO capacity contribution of graphite/LTO can be ascribed to the direct contact LTO to the electrolytes, where the dissociated lithium ion can be inserted to the LTO with less steric hindrance compared with the case of LTO/graphite. The need for dual graphite/LTO layer is further demonstrated by the comparative studies of the cathodes using single and without any blocking layer. For example, the battery using the graphite/LTO blocking layer demonstrates the highest capacity of 1226 mAh g$^{-1}$ and the lowest polarization of 289.4 mV at 1 C, which are much better than those using only graphite (i.e., 905 mAh V, 335.6 mV), only LTO (i.e., 1050 mAh g$^{-1}$, 384.3 mV) and the pristine electrode without any blocking layer (i.e., 0.7 mAh g$^{-1}$, 1577.1 mV) (FIG. 6A-E). Even suffering from the harsh rate test, the cathode with graphite/LTO layer can recover and further cycle at 1 C over 100 cycles with a high capacity of 1005 mAh g$^{-1}$ and a good capacity retention of 82% (FIG. 1D). The versatile discharge-charge curves with three flat voltage platforms around 2.35 V, 2.1 V and 1.55 V would be attractive for enriching the kind of rechargeable batteries (inset of FIG. 1D), and this new concept of combining voltage plateaus from different materials will open a way for energy storage and conversion devices. Besides, the cell with the graphite/LTO blocking layer is sustainable even when it is cycled at 60° C., where the initial cycle capacity can reach 1551 mAh g$^{-1}$ (FIGS. 7A-C), three times higher than graphene-based electrode.[48]

Figures 2E, 2F, 2G:
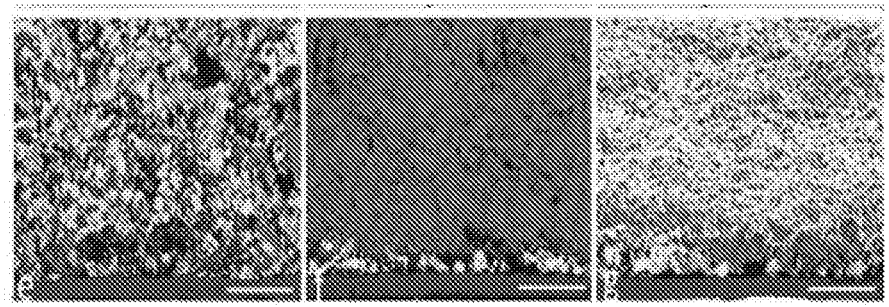

It is noted that introducing a blocking layer with available lithium ion storage capacity is a new approach and the process is simple, scalable and feasible for a sulphur electrode. FIG. 2A shows the top-view photo for the Al foil sequentially casted by sulphur layer, graphite and LTO with the average thickness of 23.6, and 8.9 and 23.9 µm respectively, as revealed by the scanning electron microscope (SEM) images in FIGS. 2B-2D. The corresponding energy-dispersive X-ray (EDX) mappings in FIGS. 2E-2G confirm that the sulphur, Super PO and binder molecules in the cathode are uniformly distributed, and they are fully covered by the graphite and LTO. Although the LTO is a typical anode in lithium ion battery, its embarrassing voltage at around 1.55 V is too high as an anode and also too low as an individual cathode. Uniquely herein, we show that the 1.55 V discharge voltage platform can be a perfect marriage with the voltage platform of 2.35 V and 2.1 V in lithium-sulphur battery, under which the LTO not only has the contribution to capacity and voltage, but it can also stabilize the cathode by blocking the dissolution/diffusion of polysulfide and act as a host for the insertion of lithium ions in its crystalline channels, thereby maximally avoiding the self-discharge of polysulfide on anode to form Li$_2$S. Further, the "zero-volume" expansion[40] and non-flammable properties of LTO capping layer are very attractive for enhancing the safety of battery.

Electrochemical Analysis

Figure 3A:
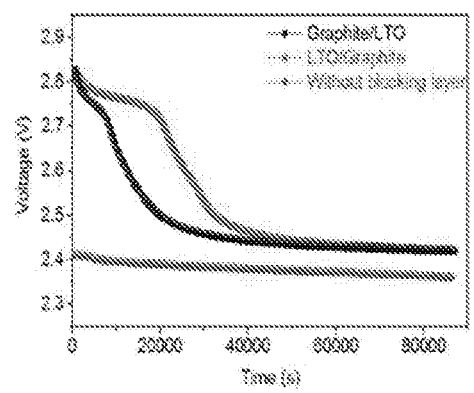
FIGS. 3A-D are electrochemical analyses.

The stability of sulphur rich electrode and the effects of blocking layer sequence are further studied by electrochemical characterizations. In the open-circuit voltage (OCV) vs. time curves (FIG. 3A), the initial OCV of the cell with the graphite/LTO and LTO/graphite is 2.83 V and 2.81 V respectively, much higher than 2.41 V for the cell without any blocking layer. The persevered high OCV confirms the efficiency of the composite layer for stabilizing the cathode and avoiding any self-discharge involved in the reactions between lithium and sulphur, which is rarely reported before. In cyclic voltammetry (CV) of the cell with LTO/graphite layer (FIG. 3B), the clearly separated reduction peaks of 2.35V and 2.1 demonstrate the continued reduction process from S$_8$ to Li$_2$S$_8$ and Li$_2$S$_6$, and then to Li$_2$S$_x$ (1≤x≤6) stepwise,[13] as manifested in the voltage vs. capacity profiles in FIG. 1B. Meanwhile, the presence of forks in the oxidation peaks around 2.42 V, corresponding to the final oxidation of Li$_2$S$_8$ to S$_8$,[49] confirms the uniform distribution of trapped polysulfide (Li$_2$S$_x$, 1≤x≤8) in specific areas with the help of dual blocking layer.

Figure 3B:
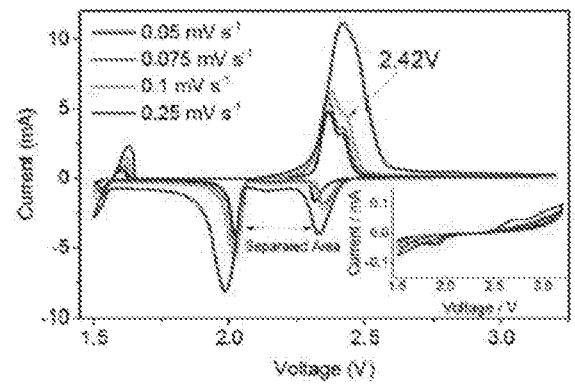
Figure 3C:
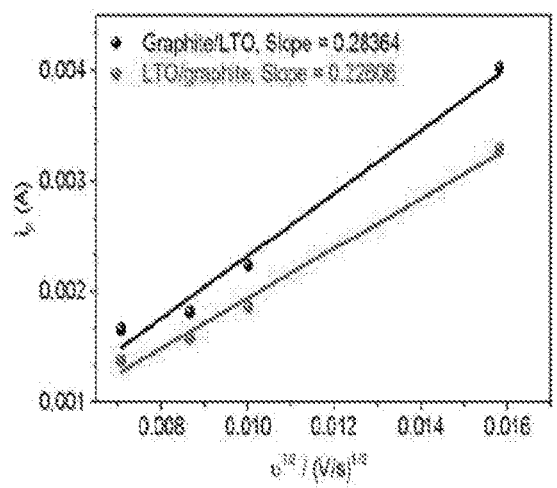
Figure 3D:
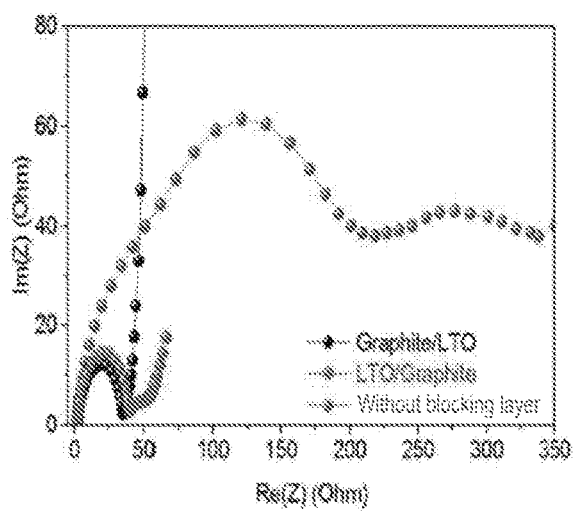

Note that the OCV decay of the cell with the graphite/LTO blocking layer from 2.83V to stabilized 2.44 V is faster than that of the cell with a LTO/graphite layer, demonstrating that the lithium ion diffusion within the graphite/LTO layer is faster. The lithium ion diffusion constant between electrodes can be estimated using the Randles-Sevcik equation:

$$i_p = 2.69 \times 10^5 n^{\frac{3}{2}} A D^{\frac{1}{2}} C v^{\frac{1}{2}}$$

where i$_p$ indicates the peak current, n is the number of electron in the reaction, A is the electrode area, υ is the scanning rate and C is the variation of lithium-ion concentration in the electrolyte.[3] The plot of normalized peak current (i$_p$) with the square root of the scan rate (υ$^{1/2}$) is displayed in FIG. 3C and the value of the diffusion constant is extracted as 1.15×10$^{-7}$ cm$^2$ s$^{-1}$ for the cell with graphite/LTO layer, which is indeed faster than 7.28×10$^{-8}$ cm$^2$ s$^{-1}$ of that with graphite/LTO layer. The order of magnitude of these values is comparable to recent result[50] and much higher than metal oxide cathode in lithium ion battery.[51] It indicate that the impact of adopting composite blocking layers to the lithium ion diffusion constant is limited particularly for the layer of graphite/LTO. This could be due to the rich boundaries of layers and crystalline channels of LTO which are sufficient enough for the transport of lithium ions. The Niquist plot (FIG. 3D) for aged electrodes in electrochemical impedance spectroscopy (EIS) studies suggests that the direct contact of the graphite layer to sulphur helps to increase the electrical conductivity of electrodes, where the electrode-charge resistance for the graphite/LTO is 32.4Ω, lower than 52.5Ω for the LTO/graphite and 324.3Ω of the pristine electrode. Furthermore, the highest slope of the graphite/LTO at high frequencies confirms its superior lithium ion diffusion than the LTO/graphite.

Visualization of S-Dissolution and Operando Raman Spectrum

Figure 4D:
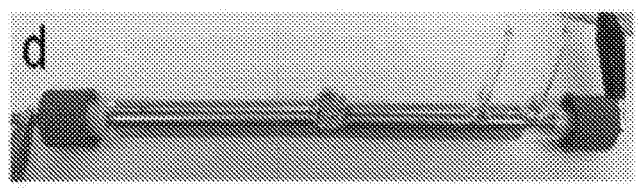

The dissolution and diffusion of polysulphides with charge/discharge cycles can be visually observed using a home made glass tube battery, where a lithium foil, a separator, blocking layer, and a cathode can be assembled in the middle of the glass tube. A small chamber right next to the battery is designed to host electrolytes, which allows the confocal laser light to probe the signals of electrolytes simultaneously (see FIG. 8 for details of the set-up). First, the dissolution of sulphur can be directly visualized by the colour change of the electrolyte from colourless to yellow with the cycling. FIGS. 4A, 4B and 4C demonstrate that the colour of the electrolyte for the cell without a blocking (FIG. 4C) turns darkest at the $50^{th}$ cycle, indicating the dissolution of sulphur species in electrolytes is pronounced. The cell with the graphite/LTO (FIG. 4A) shows the lightest yellow colour among the three cells, corroborating that the graphite/LTO exhibits the best blocking performance for sulphur species.

Figure 4E:
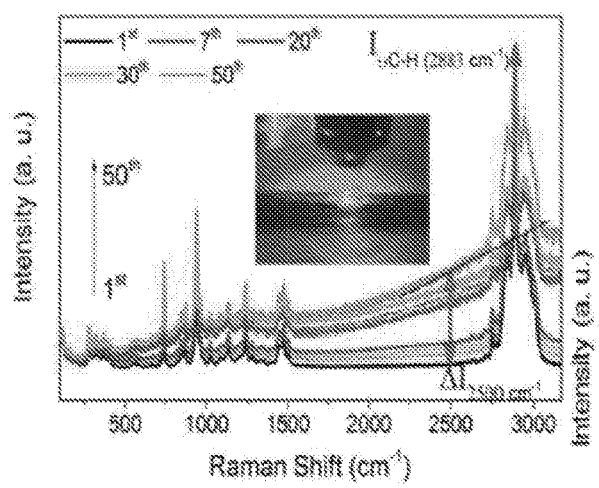
Figure 4F:
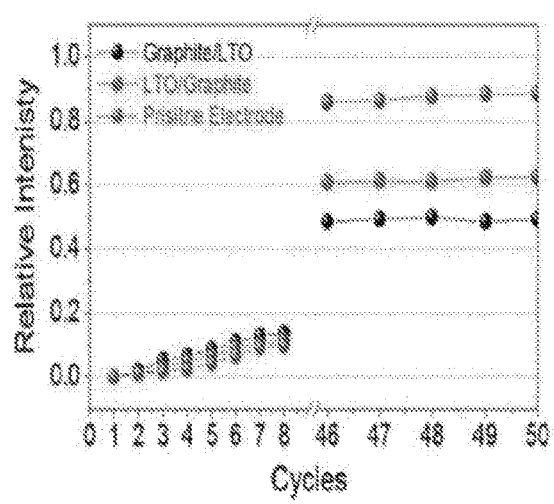

We analyse the operando Raman spectra for the initial 50 cycles of three different cells. One obvious observation is that the baseline (background) of the spectra shifts up with the progress of charge/discharge cycle (FIG. 4D), which is attributed to the scattering of the laser light caused by the dissolution of sulphur species in electrolytes (FIGS. 9A-B). We plot the arbitrary intensity of the baseline at 2500 $cm^{-1}$ as a function of cycle number for three cells. FIG. 4E shows that the relative intensity of the baseline for the cell without a blocking layer is the highest at the $50^{th}$ cycle, consistent with the visual observation in FIGS. 4A-4C. Note that the baseline intensity increase for the cell without a blocking layer does not show significant difference with other two cells in initial cycles but it deviates quickly with cycling. This suggests that the dissolution of polysulphides is an accumulation process and then gives rise to the highest baseline intensity (vs. darkest colour of the electrolyte) (FIG. 4E). In Raman spectra, one can identify the symmetric stretching mode of typical $S_3^-$ species at around 534 $cm^{-1}$ (FIG. 4G-4I),[52] where the results again suggest that the LTO/graphite layer is the most efficient blocking structure because of its weakest Raman signal at 534 $cm^{-1}$.

Reaction Process

Figure 5D:
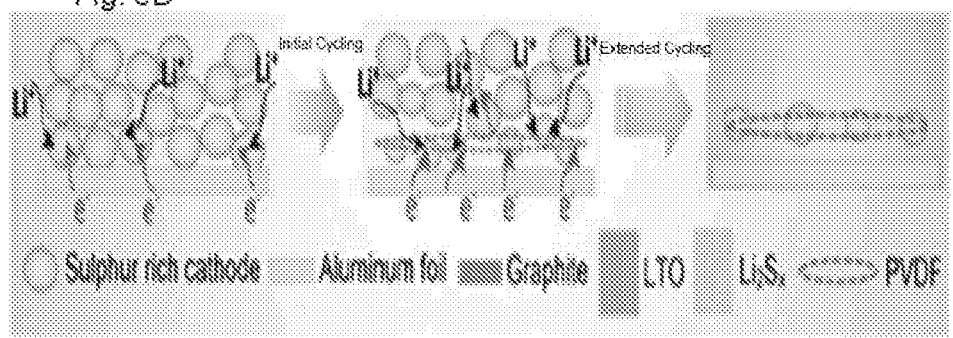
Figure 6A:
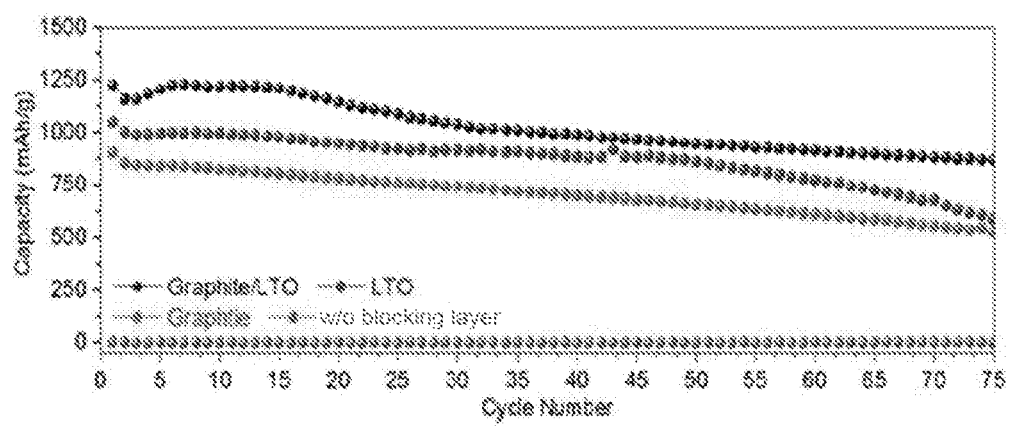
FIGS. 6A-E illustrate electrochemical performances of batteries without and with different blocking layer.
Figure 6B:
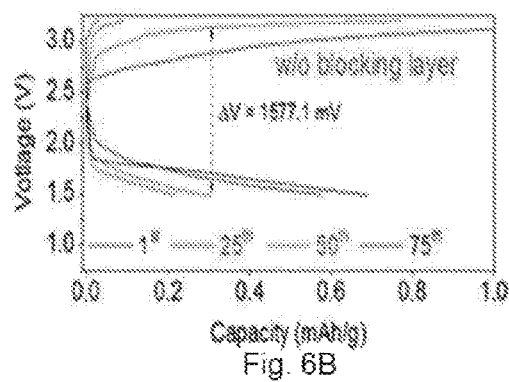
Figure 6C:
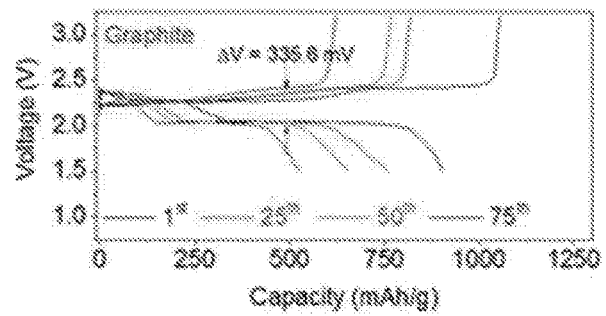
Figure 6D:
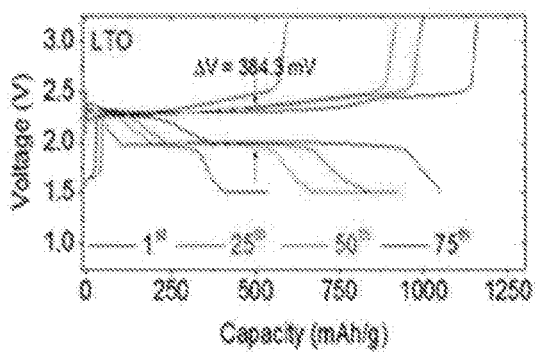
Figure 6E:
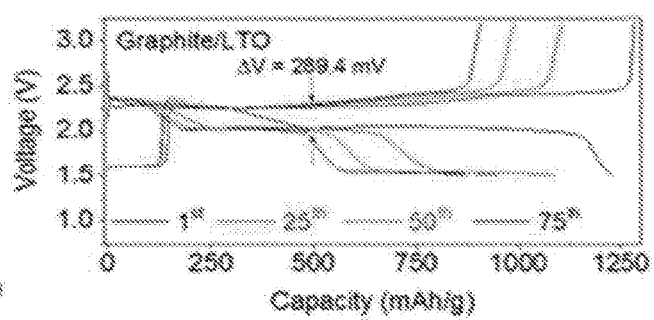

The cycled sulphur electrodes are disassembled from the coin cell and characterized by the energy-dispersive X-ray (EDX) to reveal the evolution of electrode with cycling. Based on the experimental observations, we proposed a model to interpret the high capacity from graphite/LTO capped sulphur electrode. When the sulphur-rich electrode is assembled to the battery without capping layers, the reaction $Li^+ + S_8 + e^- \rightarrow Li_2S_x (x=1-8)$ shall happen and certain amount of sulphur may be reacted as confirmed by the emergence of $S_3^-$ in Raman. However, the EIS result shows that the electrical resistance of the pristine sulphur cathode is high and thus the reaction between sulphur and lithium ions is limited. In the discharge process, the reaction lithium ion and sulphur is still prohibited because of the low electrical transport, thereby giving rise to a very low capacity and large voltage polarization (FIG. 6A). Only the bottom sulphur particles close to the aluminium foil (current collector) have a high chance to react since they are closer to the current collector. The reaction and dissolution of sulphur particles close to the Al foil in initial cycles lead to the gradual precipitation of PVDF binder molecules and Super P® carbon on Al surface, as confirmed by the SEM/EDXA results in which the sulphur is gradually removed with cycling (FIG. 5A-5C). With the extended cycling, the sulphur electrode can be easily peeled from the Al current collector due to the interfacial precipitation of PVDF (inset of FIG. 5O). FIG. 5D shows the schematics for the proposed reaction mechanism.

Figure 5E:
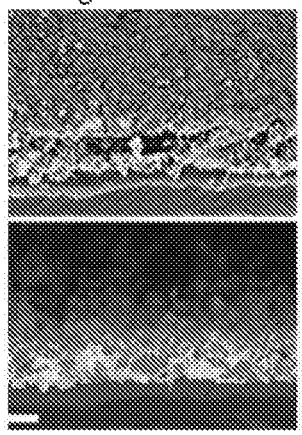
Figure 5F:
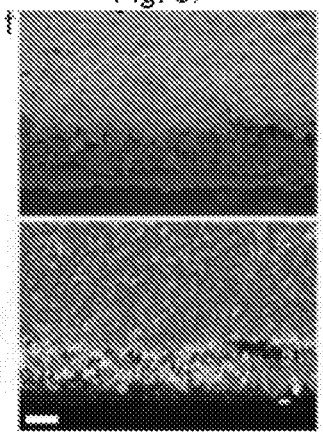
Figure 5G:
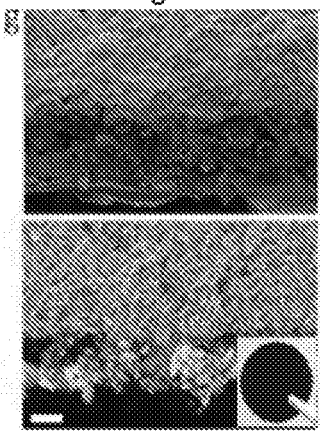
Figure 5H:
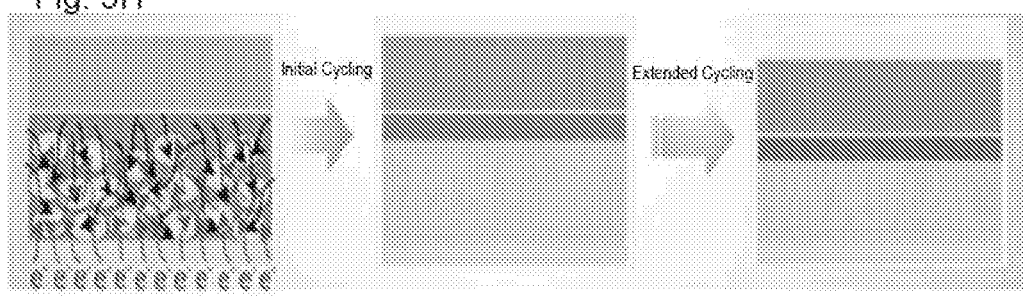

When the sulphur rich cathode is covered by the graphite layer, the graphite particles fill in the vacant areas between sulphur particles. And then the electrode was further covered by the layer of LTO (FIG. 5E). In this way, the graphite layer contacts well with the aluminium foil, sulphur cathode and LTO layer together even for cycling (FIG. 5F, 5G), thereby providing a better pathway for charge movement (FIG. 5H). Thus, the sulphur utilization can achieve 100% because the protection of dual layer which avoids the sulphur pre-dissolution and faster charge movement. The higher sulphur utilization of battery using graphite/LTO layer than that of pristine electrode was further confirmed by the current value under CV curves (FIG. 3B). For example, the current of battery using graphite/layer can achieve 7.5 mA at 0.01 mV $s^{-1}$ while the battery with pristine electrode only shows the value less than 0.1 mA (inset of FIG. 3B). Benefiting from the covering of dual layer, the dissolution and diffusion of polysulfide was largely suppressed, particularly the LTO can host the lithium ions at the voltage of 1.55 V under which it can effectively avoid the formation of $Li_2S$ on anode. During the cycling, the cathode remains integrated as revealed in inset of FIG. 5G, and the reaction process was presented in FIG. 5H. Together with the robust layer protection ability, fast lithium diffusion constant and low electric resistance, they are responsible for the high utilization of sulphur in the structure with graphite/LTO.

Conclusion

A new hybrid lithium-sulphur battery with exceptional capacity over 1866 mAh $g^{-1}$ and multi-voltage platforms from 2.35 V, 2.1 V to 1.55 V were presented. The energy density over 3863 Wh $kg^{-1}$ is at least ten times higher than lithium ion battery and also superior than the theoretical 2600 Wh $kg^{-1}$ of lithium-sulphur battery. An efficient dual blocking layer of graphite/$Li_4Ti_5O_{12}$ was presented for the first time to get a 100% utilization of sulphur cathode. The battery using graphite/LTO blocking layer has the robust capacity around 1226 mAh $g^{-1}$ at the high rate of 10 with endurable cycle life over 100 cycles. The hybrid lithium battery with the concept of composite layers may stimulate the research to marry various materials with lithium storage capacity for future energy storage and conversion devices.

REFERENCES FOR EXAMPLE 1

1 P. G. Bruce, S. A. Freunberger, L. J. Hardwick and J. M. Tarascon, *Nat. Mater.*, 2012. 11, 19-29.
2 B. Scrosati, J. Hassoun and Y. K. Sun, *Energy Environ. Sci.*, 2011.4, 3287-3295.
3 H. G. Jung, J. Hassoun, J. B, Park, Y. K. Sun and B. Scrosati, *Nat. Chem.*, 2012. 4, 579-585.
4 Z. Q. Peng, S. A. Freunberger, Y. H. Chen and P. G. Bruce, *Science*, 2012. 337, 563-566.
5 Q. C. Liu, J. J. Xu, D. Xu and X. B. Zhang, *Nat. Commun.*, 2015. 6, DOI: 10.1038/ncomms8892.
6 J. Lu, L. Li, J. B. Park, Y. K. Sun, F. Wu and K. Amine, *Chem. Rev.*, 2014. 114, 5611-5640.
7 R. Demir-Cakan, M. Morcrette, Gangulibabu, A. Gueguen, R. Dedryvere and J. M. Tarascon, *Energy Environ. Sci.*, 2013. 6, 176-182.
8 A. Manthiram, Y. Z. Fu, S. H. Chung, C. X. Zu and Y. S. Su, *Chem. Rev.*, 2014. 114, 11751-11787.
9 S. Evers and L. F. Nazar, *Acc. Chem. Res.*, 2013. 46, 1135-1143.
10 Urbonaite, T. Poux and P. Novák, *Adv. Energy Mater.*, 2015. 5, DOI: 10.1002/aenm.201500118.
11 S. K. Lee, S. M. Oh, E. Park, B. Scrosati, J. Hassoun, M. S. Park, Y. J. Kim, H. Kim, I. Belharouak and Y. K. Sun, *Nano Lett.*, 2015. 15, 2863-2868.

12 T. Ohzuku and Y. Makimura, *Chem. Lett.,* 2001, 642-643.
13 Y. V. Mikhaylik and J. R. Akridge, *J. Electrochem, Soc.,* 2004. 151, A1969-A1976.
14 L. Wang, Y. G. Wang and Y. Y. Xia, *Energy Environ. Sci.,* 2015. 8, 1551-1558.
15 M. Agostini, S. Z. Xiong, A. Matic and J. Hassoun, *Chem. Mater.,* 2015. 27, 4604-4611.
16 X. L. Ji, K. T. Lee and L, F, Nazar, *Nat, Mater.,* 2009, 8, 500-506,
17 G. He, X. L. Ji and L. Nazar, *Energy Environ. Sci.,* 2011.4, 2878-2883.
18 N. Jayaprakash, J. Shen, S. S. Moganty, A. Corona and L. A. Archer, *Angew. Chem. Int. Ed.,* 2011. 50, 5904-5908.
19 J. Kim, D. J. Lee, H. G. Jung, Y. K. Sun, J. Hassoun and B. Scrosati, *Adv. Funct. Mater.,* 2013. 23, 1076-1080.
20 J. C. Guo, Y. H. Xu and C. S. Wang, *Nano Lett.,* 2011. 11, 4288-4294.
21 G. M. Zhou, D. W. Wang, F. Li, P. X. Hou, L. C. Yin, C. Liu, G. Q. Lu, I. R. Gentle and H. M. Cheng, *Energy Environ. Sci.,* 2012. 5, 8901-8906.
22 L. W. Ji, M. M. Rao, H. M. Zheng, L. Zhang, Y. C. Li, W. H. Duan, J. H. Guo, E. J. Cairns and Y. G. Zhang, *J. Am. Chem. Soc.,* 2011. 133, 18522-18525.
23 Z. W. Seh, W. Y. Li, J. J. Cha, G. Y. Zheng, Y. Yang, M. T. McDowell, P. C. Hsu and Y. Cui, *Nat. Commun.,* 2013. 4, 1331.
24 H. L. Wang, Y. Yang, Y. Y. Liang, J. T. Robinson, Y. G. Li, A. Jackson, Y. Cui and H. J. Dai, *Nano Lett.,* 2011. 11, 2644-2647.
25 W. D. Zhou, Y. C. Yu, H. Chen, F. J. DiSalvo and H. D. Abruna, *J. Am. Chem. Soc.,* 2013. 135, 16736-16743.
26 J. L. Wang, Z. D. Yao, C. VV. Monroe, J. Yang and Y. Null *Adv. Funct. Mater.,* 2013. 23, 1194-1201.
27 J. Hassoun and B. Scrosati, *Angew. Chem. Int. Ed.,* 2010. 49, 2371-2374.
28 M. Agostini and J. Hassoun, *Sci. Rep.,* 2015. 5, 7591.
29 Z. Lin, Z. C. Liu, W. J. Fu, N. J. Dudney and C. D. Liang, *Angew, Chem. Int. Ed.,* 2013. 52, 7460-7463.
30 S. S. Zhang, *Electrochimica Acta,* 2012. 70, 344-348.
31 X. L. Ji, S. Evers, R. Black and L. F. Nazar, *Nat. Commun.,* 2011. 2,325.
32 Y. Z. Fu, Y. S. Su and A. Manthiram, *Angew, Chem. Int. Ed.,* 2013. 52, 6930-6935.
33 M. Agostini, B. Scrosati and J. Hassoun, *Adv. Energy Mater.,* 2015. 5. DOI:10.1002/aenm.201500481.
34 Y. Z. Fu, Y. S. Su and A. Manthiram, *Adv. Energy Mater.,* 2014. 4, 1300655.
35 Y. S. Su and A. Manthiram, *Nat. Commun.,* 2012. 3, 1166.
36 C. Huang, J. Xiao, Y. Y. Shao, J. M. Zheng, W. D. Bennett, D. P. Lu, L. V. Saraf, M. Engelhard, L. W. Ji, J. G. Zhang, X. L. Li, G, L. Graff and J. Liu, *Nat. Commun.,* 2014. 5, 3343.
37 S. H. Chung and A. Manthiram, *Adv. Funct. Mater.,* 2014. 24, 5299-5306.
38 J. Q. Huang, Q. Zhang, H. J. Peng, X. Y. Liu, W. Z. Qian and F. Wei, *Energy Environ. Sci.,* 2014. 7, 347-353.
39 G. Q. Ma, Z. Y. Wen, M. F. Wu, C. Shen, Q. S. Wang, J. Jin and X. W. Wu, *Chem. Commun.,* 2014. 50, 14209-14212.
40 K. Zaghib, M. Simoneau, M. Armand and M. Gauthier, *J. Power Sources,* 1999. 81, 300-305.
41 H. G. Jung, M. W. Jang, J. Hassoun, Y. K. Sun and B. Scrosati, *Nat. Commun.,* 2011.2, 516.
42 H. W. Chen, C. H. Wang, W. L. Dong, W. Lu, Z. L. Du and L. W. Chen, *Nano Lett.,* 2015. 15, 798-802.
43 S. Xin, L. Gu, N. H. Zhao, Y. X. Yin, L. J. Zhou, Y. G. Guo and L. J. Wan, *J. Am. Chem. Soc.,* 2012. 134, 18510-18513.
44 L. W. Ji, M. M. Rao, S. Aloni, L. Wang, E. J. Cairns and Y. G. Zhang, *Energy & Environmental Science,* 2011. 4, 5053-5059.
45 Y. S. Su, Y. Z. Fu, T. Cochell and A. Manthiram, *Nat. Commun.,* 2013. 4, 2985.
46 G. M. Zhou, E. Paek, G. S. Hwang and A. Manthiram, *Nat. Commun.,* 2015. 6, 7760.
47 J.-Y. Hwang, H. M. Kim, S.-K. Lee, J.-H. Lee, A. Abouimrane, M. A. Khaleel, I. Belharouak, A. Manthiram and Y.-K. Sun, *Adv. Energy Mater.,* 2015, DOI: 10.1002/aenm.201501480.
48 J. Q. Huang, X. F. Liu, Q. Zhang, C. M. Chen, M. Q. Zhao, S. M. Zhang, W. C. Zhu, W. Z. Qian and F. Wei, *Nano Energy,* 2013. 2, 314-321.
49 H.-D. Shin, M. Agostini, I. Belharouak, J. Hassoun and Y.-K. Sun, *Carbon,* 2016. 96, 125-130.
50 J. Q. Huang, T. Z. Zhuang, Q. Zhang, H. J. Peng, C. M. Chen and F. Wei, *ACS Nano,* 2015. 9, 3002-3011.
51 M. Park, X. C. Zhang, M. D. Chung, G. B. Less and A. M. Sastry, *J. Power Sources,* 2010. 195, 7904-7929.
52 H. L. Wu, L. A. Huff and A. A. Gewirth, *ACS Appl. Mater. Interfaces,* 2015. 7, 1709-1719.

EXAMPLE 2

TABLE 1

Theoretical capacity of lithium-sulfur battery in step-sized electrochemical reactions.

| Main step-sized electrochemical reactions | Theoretical capacity/mAh g$^{-1\dagger}$ |
|---|---|
| $S_8 + 2Li^+ + 2e^- \rightarrow Li_2S_8$ | 209.38 |
| $Li_2S_8 + 2/3Li^+ + 2/3e^- \rightarrow 4/3Li_2S_6$ ($2S_3^{*-}$) | 69.79 |
| $Li_2S_6 + Li^+ + e^- \rightarrow 3/2Li_2S_4$ | 139.59 |
| $Li_2S_4 + 2/3Li^+ + 2/3e^- \rightarrow 4/3Li_2S_3$ | 139.59 |
| $Li_2S_3 + Li^+ + e^- \rightarrow 3/2Li_2S_2$ | 279.18 |
| $Li_2S_2 + 2Li^+ + 2e^- \rightarrow 2Li_2S$ | 837.54 |

$^\dagger$Theoretical capacity was calculated by the equation of $C = N_A * q * n/3.6/M_s$, in which $N_A$, q, n and $M_s$ are the Avogadro constant (i.e., $6.02214 \times 10^{23}$ mol$^{-1}$), elementary charge (i.e., $1.602176 \times 10^{-19}$ C, 1 mAh = 3.6 C), number of transferred electron and molar mass of sulfur participated in the reaction respectively.

TABLE 2

Capacity ratio of $Q_1/Q_{slop}$ and $(Q_1 + Q_{slope})/Q_2$ in the 1$^{st}$ cycle compared with previous results.

| Kind of Electrode$^\dagger$ | Total Capacity | $Q_1$ | $Q_{slope}$ | $Q_2$ | $Q_{solpe}/Q_1$ vs. $(Q_1 + Q_{slope})/Q_2$$^{\dagger\dagger}$ | Reference |
|---|---|---|---|---|---|---|
| Super P ®-S@graphite@LTO | 1675 | 321 | 218 | 1136 | 0.679 vs. 0.474 | This work |
| CMK-3/S | 1000 | 133 | 87 | 780 | 0.654 vs. 0.282 | [1] |
| S-TiO$_2$ yolk-shell (0.2 C) | 1010 | 225 | 125 | 660 | 0.556 vs. 0.530 | [2] |

TABLE 2-continued

Capacity ratio of $Q_1/Q_{slop}$ and $(Q_1 + Q_{slope})/Q_2$
in the $1^{st}$ cycle compared with previous results.

| Kind of Electrode[†] | Total Capacity | $Q_1$ | $Q_{slope}$ | $Q_2$ | $Q_{solpe}/Q_1$ vs. $(Q_1 + Q_{slope})/Q_2$[††] | Reference |
|---|---|---|---|---|---|---|
| Porous carbon spheres/S | 1190 | 190 | 120 | 880 | 0.6315 vs. 0.352 | [3] |
| Graphene-S | 1500 | 300 | 200 | 1000 | 0.667 vs. 0.500 | [4] |
| Carbon spheres/3 (0.25 C) | 800 | <20 | <10 | ~770 | 0.500 vs. 0.039 | [5] |
| Sulfur-rich polymer (0.2 C) | 1050 | 200 | 100 | 750 | 0.500 vs. 0.400 | [6] |
| S@GDL (0.12 C) | 1300 | 200 | 130 | 970 | 0.650 vs. 0.340 | [7] |
| Carbon nanotube/NiFe$_2$O$_4$—S | 1350 | 250 | 150 | 950 | 0.600 vs. 0.421 | [8] |
| N-doped hollow carbon/S | 1140 | 200 | 130 | 810 | 0.520 vs. 0.407 | [9] |
| Polyacrylonitrile/S (0.2 C) | 1300 | 200 | 110 | 990 | 0.550 vs. 0.313 | [10] |
| S/MnO$_2$ (0.05 C) | 1300 | 250 | 150 | 900 | 0.600 vs. 0.444 | [11] |
| S/hollow mesoporous titania@Carbon nanotubes | 1560 | 300 | 150 | 1110 | 0.500 vs. 0.405 | [12] |
| Stacked graphene-S | 1200 | 250 | 150 | 800 | 0.600 vs. 0.500 | [13] |
| S/Ti$_2$C (Mxene) (0.05 C) | 1420 | 265 | 165 | 1000 | 0.6226 vs. 0.420 | [14] |

[†]If without noting the current density, the electrode was performed at the rate of 0.1° C.
[††]The ratio of $Q_{slope}/Q_1$ and $(Q_1 + Q_{slope})/Q_2$ are more accurate for comparing the results because it can avoid the error resulted from the mass of active materials (i.e., sulfur) in the electrode. The longer discharge curve of $Q_{slope}$ comparing to $Q_1$ with the highest ratio value of 0.679 demonstrate that a lot of soluble sulfur species are well trapped in the blocking layer and then could be reacted to contribute a high capacity. And also, a high ratio of $(Q_1 + Q_{slope})/Q_2$ demonstrate that a good protection of sulfur species avoiding from their dissolution/migration towards lithium anode side.

REFERENCES FOR EXAMPLE 2

1. X. L. Ji, K. T. Lee and L. F. Nazar, *Nat. Mater.*, 2009. 8, 500-506.
2. Z. W. Seh, W. Y. Li, J. J. Cha, G. Y. Zheng, Y. Yang, M. T. McDowell, P. C. Hsu and Y. Cui, *Nat. Commun.*, 2013. 4, 1331.
3. J. Liu, T. Y. Yang, D. W. Wang, G. Q. M. Lu, D. Y. Zhao and S. Z. Qiao, *Nat. Commun.*, 2013. 4, 2798.
4. T. Q. Lin, Y. F. Tang, Y. M. Wang, H. Bi, Z. Q. Liu, F. Q. Huang, X. M. Xie and M. H. Jiang, *Energy Environ. Sci.*, 2013. 6, 1283-1290.
5. B. Zhang, X. Qin, G. R. Li and X. P. Gao, *Energy Environ. Sci.*, 2010. 3, 1531-1537.
6. H. Kim, J. Lee, H. Ahn, O. Kim and M. J. Park, *Nat. Commun.*, 2015. 6, 7278.
7. S. K. Lee, S. M. Oh, E. Park, B. Scrosati, J. Hassoun, M. S. Park, Y. J. Kim, H. Kim, I. Belharouak and Y. K. Sun, *Nano Lett.*, 2015. 15, 2863-2868.
8. Q. Fan, W. Liu, Z. Weng, Y. M. Sun and H. L. Wang, *J. Am. Chem. Soc.*, 2015. 137, 12946-12953.
9. W. Zhou, X. Xiao, M. Cai and L. Yang, *Nano Lett.*, 2014. 14, 5250-6.
10. S. Y. Wei, L. Ma, K. E. Hendrickson, Z. Y. Tu and L. A. Archer, *J. Am. Chem. Soc.*, 2015. 137, 12143-12152.
11. X. Liang, C. Hart, Q. Pang, A. Garsuch, T. Miss and L. F. Nazar, *Nat. Commun.*, 2015. 6.
12. J.-Y. Hwang, H. M. Kim, S.-K. Lee, J.-H. Lee, A. Abouimrane, M. A. Khalee I. Belharouak, A. Manthiram and Y.-K. Sun, *Adv. Energy Mater.*, 2015, DOI: 10.1002/aenm.201500481.
13. M. Q. Zhao, Q. Zhang, J. Q. Huang, G. L. Tian, J. Q. Nie, H. J. Peng and F. Wei, *Nat. Commun.*, 2014. 5, 3410.
14. X. Liang, A. Garsuch and L. F. Nazar, *Angew. Chem. Int. Ed.*, 2015. 54, 3907-11.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to how the numerical value determined. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

At least the following is claimed:
1. A battery, comprising:
   an anode;
   an electrolyte located next to the anode;
   a dual blocking layer that includes graphite and Li$_4$Ti$_5$O$_{12}$; and
   a cathode comprising sulfur, wherein the dual blocking layer is located between the electrolyte and the cathode, wherein the dual blocking layer is disposed on the cathode.
2. The battery of claim 1, wherein the battery is a lithium-sulfur battery.
3. The battery of claim 2, wherein the graphite of the dual layer is adjacent the sulfur cathode.
4. The battery of claim 1, wherein the Li$_4$Ti$_5$O$_{12}$ is spinel Li$_4$Ti$_5$O$_{12}$.
5. The battery of claim 2, wherein the battery has a capacity over about 1866 mAh/g.
6. The battery of claim 2, wherein the battery has an energy density over about 3860 Wh/kg.
7. The battery of claim 2, wherein the dual blocking layer has a capacity of about 1220 mAh/g at about 1 C for a life cycle of over about 100 cycles.
8. The battery of claim 2, wherein the battery has a sulfur utilization rate more than about 90%.

9. A battery, comprising:
an anode;
an electrolyte located next to the anode;
a dual blocking layer that includes a conductive material and a lithium storage medium; and
a cathode comprising sulfur, wherein the dual blocking layer is located between the electrolyte and the cathode,
wherein the dual blocking layer is disposed on the cathode.

10. The battery of claim 9, wherein the conductive material is selected from the group consisting of: a carbon based material, a conductive polymer, and a combination thereof.

11. The battery of claim 10, wherein the carbon based material is selected from the group consisting of: graphite, conductive carbon black, active carbon, activated carbon, acetylene black, carbon nanotubes, graphene, graphene oxide, and combinations thereof.

12. The battery of claim 10, wherein the conductive polymer is selected from the group consisting of: polyaniline, polypyrrole, polythiophenes, PEDOT:PSS, chitosan, and a combination thereof.

13. The battery of claim 9, wherein the lithium storage medium is selected from the group consisting of: $Li_4Ti_5O_{12}$, $TiO_2$, $MoO_2$, $Fe_2O_3$, $Co_3O_4$, $MoS_2$, and a combination thereof.

14. A method, comprising:
providing an anode;
providing an electrolyte next to the anode;
providing a dual blocking layer that includes graphite and $Li_4Ti_5O_{12}$;
providing a cathode comprising sulfur, wherein the dual blocking layer is located between the electrolyte and the cathode; and
disposing the dual blocking layer on the cathode,
wherein the dual blocking layer includes a conductive material and a lithium storage medium.

15. The method of claim 14, wherein disposing the dual blocking layer on the cathode comprises:
depositing a graphite layer on the cathode; and
depositing a $Li_4Ti_5O_{12}$ layer on the graphite layer.

16. The method of claim 14, wherein the cathode, the dual blocking layer, the electrolyte, and the anode form a lithium-sulfur battery.

17. The method of claim 16, wherein the anode is comprised of lithium metal.

18. The method of claim 16, further comprising:
arranging the cathode on aluminum foil, wherein the cathode further comprises carbon.

19. The method of claim 14, further comprising:
forming the cathode by
combining sulfur and carbon black to form a composite;
mixing the composite with polyvinylidene difluoride to form a slurry;
casting the slurry on aluminum foil to form an electrode; and
drying the electrode.

20. The method of claim 19, wherein disposing the dual blocking layer on the cathode further comprises:
coating the electrode with graphite; and
coating the graphite with $Li_4Ti_5O_{12}$.

* * * * *